(12) United States Patent
Oh et al.

(10) Patent No.: US 10,882,750 B2
(45) Date of Patent: Jan. 5, 2021

(54) METHOD FOR PREPARING SILICA AEROGEL-CONTAINING BLANKET AND SILICA AEROGEL-CONTAINING BLANKET PREPARED BY USING THE SAME

(71) Applicant: LG CHEM, LTD, Seoul (KR)

(72) Inventors: Kyoung Shil Oh, Daejeon (KR); Mi Ri Kim, Daejeon (KR); Je Kyun Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 15/554,383

(22) PCT Filed: Mar. 28, 2016

(86) PCT No.: PCT/KR2016/003152
§ 371 (c)(1),
(2) Date: Aug. 29, 2017

(87) PCT Pub. No.: WO2016/167494
PCT Pub. Date: Oct. 20, 2016

(65) Prior Publication Data
US 2018/0179073 A1    Jun. 28, 2018

(30) Foreign Application Priority Data

Apr. 14, 2015 (KR) .................. 10-2015-0052537
Mar. 25, 2016 (KR) .................. 10-2016-0035850

(51) Int. Cl.
| | | |
|---|---|---|
| *C01B 33/158* | (2006.01) | |
| *C01B 33/155* | (2006.01) | |
| *C01B 33/14* | (2006.01) | |
| *B05D 1/18* | (2006.01) | |
| *B05D 3/02* | (2006.01) | |

(52) U.S. Cl.
CPC ............ *C01B 33/1585* (2013.01); *B05D 1/18* (2013.01); *B05D 3/0254* (2013.01); *C01B 33/14* (2013.01); *C01B 33/155* (2013.01); *C01P 2006/32* (2013.01)

(58) Field of Classification Search
CPC .................................................. C01B 33/1585
USPC ........................................................ 427/376.1
See application file for complete search history.

(56) References Cited

U.S. PATENT DOCUMENTS

| | | | |
|---|---|---|---|
| 5,789,075 A | 8/1998 | Frank et al. | |
| 2005/0192366 A1 | 9/2005 | Ou et al. | |
| 2005/0192367 A1 * | 9/2005 | Ou ....................... | C01B 33/155 521/64 |
| 2008/0069753 A1 | 3/2008 | Floess et al. | |
| 2011/0240907 A1 | 10/2011 | Sharma et al. | |
| 2015/0065590 A1 | 3/2015 | Rhine et al. | |
| 2017/0074449 A1 | 3/2017 | Rhine et al. | |
| 2018/0010726 A1 | 1/2018 | Kim et al. | |

FOREIGN PATENT DOCUMENTS

| | | | |
|---|---|---|---|
| CN | 1749214 A | 3/2006 | |
| CN | 1888302 A | 1/2007 | |
| CN | 101450852 A | 6/2009 | |
| CN | 101517012 A | 8/2009 | |
| EP | 2231789 A1 * | 9/2010 | ............... C09D 1/02 |
| EP | 3257812 A1 | 12/2017 | |
| JP | 2002-256170 A | 9/2002 | |
| KR | 100385829 B | 10/2003 | |
| KR | 1020080093772 A | 10/2008 | |
| KR | 1020100010350 A | 2/2010 | |
| KR | 1020110125773 A | 11/2011 | |
| KR | 1020110126381 A | 11/2011 | |

* cited by examiner

*Primary Examiner* — Tabatha L Penny
(74) *Attorney, Agent, or Firm* — Dentons US LLP

(57) ABSTRACT

In the present invention are provided a method for preparing a silica aerogel-containing blanket, and a blanket which includes a silica aerogel and is manufactured using the same, wherein the method includes a step for preparing a reaction solution by reacting a silazane-based surface modification agent with an alcohol-based compound, a step for preparing a silica gel-base material composite by adding a silica precursor, water, and a polar organic solvent to the reaction solution to prepare a silica sol, and then immersing a base material for a blanket in the prepared silica sol to gelate the silica sol, and a step for drying the silica gel-base material composite.

15 Claims, 2 Drawing Sheets

METHOD FOR PREPARING SILICA AEROGEL-CONTAINING BLANKET AND SILICA AEROGEL-CONTAINING BLANKET PREPARED BY USING THE SAME

CROSS REFERENCE TO RELATED APPLICATION

This application is a National Stage Application of International Application No. PCT/KR2016/003152, filed Mar. 28, 2016, and claims the benefit of Korean Patent Application No. 10-2016-0035850, filed Mar. 25, 2016, and Korean Patent Application No. 10-2015-0052537, filed Apr. 14, 2015, contents of which are incorporated herein by reference in their entirety for all purposes as if fully set forth below.

TECHNICAL FIELD

The present invention relates to a method for preparing a silica aerogel-containing blanket and a silica aerogel-containing blanket prepared by using the same. The method is capable—without a separate surface modification step and using minimal amounts of surface modification agents—of manufacturing a blanket, which includes a silica aerogel and has low thermal conductivity and excellent mechanical flexibility, by forming a silica aerogel having high hydrophobicity and excellent physical properties, in particular high porosity.

BACKGROUND ART

Recently, as industrial technology becomes moreadvanced, interest in aerogels having excellent thermal insulation properties is increasing. Aerogels developed up to the present time are organic aerogels, such as resorcinol-formaldehyde or melamine-formaldehyde aerogel particles and the like, and inorganic aerogels, such as silica ($SiO_2$), alumina ($Al_2O_3$), titania ($TiO_2$), or carbon (C) aerogels and the like, including metal oxides.

Among these, silica aerogels, as highly porous materials having high porosities and specific surface areas, and low thermal conductivities, are expected to be utilized in numerous fields, such as thermal insulation materials, catalysts, sound absorbing materials, and interlayer insulating materials in semiconductor circuits. Although the rate of commercialization is extremely slow due to complex manufacturing processes and low mechanical strength and the like, continued research has resulted in the introduction of early-stage applications, and the rate of market expansion for thermal insulation materials and other products is steadily accelerating.

Such silica aerogels have low mechanical strength due to a porous structure, and thus are productized into forms such as aerogel blankets or aerogel sheets by being composited with a base material such as a typical glass fiber, ceramic fiber, or polymer fiber.

For example, a silica aerogel-containing blanket and using the silica aerogel is manufactured through a silica sol preparation step, a gelation step, an aging step, and a surface modification step. However, such typical methods for manufacturing a silica aerogel-containing blanket involve complex processes, and are uneconomical in terms of time and cost. Moreover, a step for surface modification of the silica aerogel is required, for which large amounts of organic solvents and expensive hydrobizing agents are used. Furthermore, processes for recovery and separation of byproducts generated in the surface modification step are required, and thus there is difficulty in commercializing blankets which silica aerogel.

Thus, there is a need for developing a method in which surface modification steps can be excluded, or the amount of surface modification agents used can be minimized, when manufacturing blankets using silica aerogels.

DISCLOSURE OF THE INVENTION

Technical Problem

An object of the present invention is to provide a method for preparing a silica aerogel-containing blanket, the method being capable—without a separate surface modification step and using minimal amounts of surface modification agents—of manufacturing a blanket, which includes a silica aerogel and has low thermal conductivity and excellent mechanical flexibility, by forming a silica aerogel having high hydrophobicity and excellent physical properties, in particular high porosity.

Another object of the present invention is to provide a silica aerogel-containing blanket which is prepared by using the method.

Still another object of the present invention is to provide a thermal insulation material comprising the silica aerogel-containing blanket.

Technical Solution

In order to achieve the objectives, according to an embodiment of the present invention, a method for preparing a silica aerogel-containing blanket is provided, which comprises a step for preparing a reaction solution by reacting a silazane-based surface modification agent with an alcohol-based compound; a step for preparing a silica gel-base material composite by adding a silica precursor, water, and a polar organic solvent to the reaction solution to prepare a silica sol, and then immersing a base material for a blanket in the prepared silica sol to gelate the silica sol; and a step for drying the silica gel-base material composite.

According to another embodiment of the present invention, a silica aerogel-containing blanket is provided, which is prepared by said method.

According to to still another embodiment of the present invention, a thermal insulation material comprising a silica aerogel-containing blanket is provided, which is prepared by said method.

Advantageous Effects

A silica aerogel-containing blanket may be conveniently manufactured without a separate solvent substitution and surface modification step by a preparing method according to the present invention.

Moreover, in the preparing method, a hydrophobizing treatment of a silica aerogel is possible using a minimal amount of a surface modification agent such that the amount of the surface modification agent used may be reduced, and the amount generated of an organic solvent and a byproduct, which can be generated in a typical surface modification step, may be reduced.

Furthermore, a blanket prepared by the preparing method has high hydrophobicity along with excellent physical properties, in particular, a low thermal conductivity and excellent mechanical flexibility by comprising a silica aerogel having high hydrophobicity, and thus can be applied to various industrial fields, such as thermal insulation materials, heat-retaining materials, or non-combustible materials.

BRIEF DESCRIPTION OF THE DRAWINGS

The following drawings accompanying the present specification exemplify desirable embodiments of the present invention, and together with the disclosure of the present invention described above, and performs the role of providing better understanding of the technical concepts of the present invention. Thus, the present invention is not to be construed as being limited to matters disclosed in the drawings.

MODE FOR CARRYING OUT THE INVENTION

Figure 1:
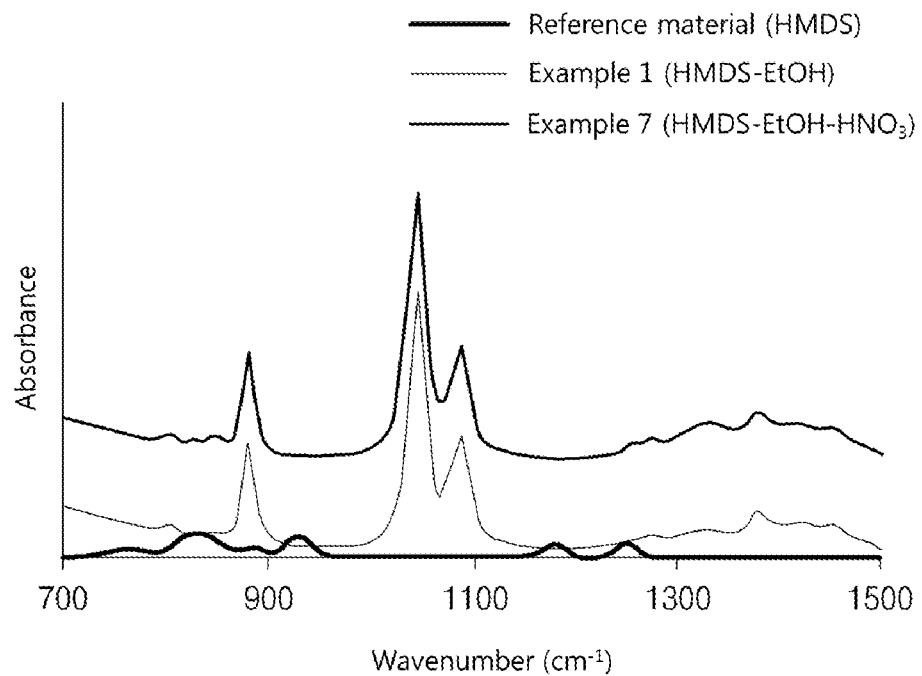
FIG. 1 is a graph displaying infrared spectroscopic analysis (IR) results, obtained in Experimental Example 1, of reaction solutions of hexamethyldisilazane and ethanol prepared in Examples 1 and 7.

Hereinafter, the present invention is described in greater detail in order to facilitate understanding of the present invention.

Terms and words used herein and in the claims should not be construed as being limited to their typical or dictionary definitions. Rather, the terms and words are to be understood as having meanings and concepts that accord with the technical concept of the present invention, based on the principle wherein the inventor can appropriately define the concepts of terms in order to describe his or her invention as best as possible.

In the present invention, when preparing a silica aerogel-containing blanket having low thermal conductivity and excellent mechanical flexibility can be conveniently manufactured by forming—without a separate surface modification step and using minimal amounts of surface modification agents—a silica aerogel having high hydrophobicity and excellent mechanical properties, in particular, high porosity. The silica aerogel can be prepared by decomposing beforehand in alcohol, a silane-based surface modification agent having an excellent hydrophobic modification effect to prepare an alkoxysilane-based compound, and gelating the alkoxysilane-based compound—as a co-precursor—with a silica sol.

Specifically, a method for preparing a silica aerogel-containing blanket according to an embodiment of the present invention comprises a step for preparing a reaction solution by reacting a silazane-based surface modification agent with an alcohol-based compound (Step 1); a step for preparing a silica gel-base material composite by adding a silica precursor, water, and a polar organic solvent to the reaction solution to prepare a silica sol, and gelating the prepared silica sol by immersing in the silica sol, a base material for the blanket (Step 2); and a step for drying the silica gel-base material composite (Step 3). Hereinafter, each step is described in detail.

Step 1

In a method for preparing a silica aerogel-containing blanket according to an embodiment of the present invention, Step 1 is a step for preparing a reaction solution by reacting a silazane-based surface modification agent with an alcohol-based compound.

Specifically, a silazane-based surface modification agent that can be used in the preparation of the reaction solution may be a silazane-based compound including at least two alkyl groups in a single molecule, and more specifically, may be the compound of Formula 1 below.

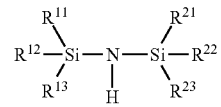

[Formula 1]

In Formula 1, $R^{11}$ to $R^{13}$ and $R^{21}$ to $R^{23}$ may each independently be a hydrogen atom or an alkyl group having a 1 to 8 carbon atoms, where $R^{11}$ to $R^{13}$ and $R^{21}$ to $R^{23}$ are not simultaneously hydrogen atoms, and more specifically, at least two among $R^{11}$ to $R^{13}$ and $R^{21}$ to $R^{23}$ are alkyl groups.

Specific examples of the silazane-based compound may include 1,2-diethyldisilazane, 1,1,2,2-tetramethyldisilazane, 1,1,3,3-tetramethyldisilazane, 1,1,1,2,2,2-hexamethyldisilazane, 1,1,2,2-tetraethyldisilazane, or 1,2-diisopropyldisilazane and the like, and one thereof by itself, or a mixture of two or more thereof, may be used.

Among these, the silazane-based surface modification agent, in order to enable the hydrophobicity of silica aerogels to be further increased, may be a tetraalkyldisilazane including two hydrogen atoms and four alkyl groups having 1 to 4 carbon atoms with respect to the silazane-based compound of Formula 1, or a hexaalkyldisilazane including six alkyl groups having 1 to 4 carbon atoms with respect to the silazane-based compound of Formula 1, and more specifically, may be hexamethyldisilazane (HMDS) or 1,1,3,3-tetramethyldisilazane.

Meanwhile, an alcohol having a 1 to 8 carbon atoms may be used as an alcohol-based compound capable of reacting with the silazane-based surface treatment agent. More specifically, when considering decomposition reaction efficiency with respect to a silazane-based surface modification agent and a subsequent efficiency-increasing effect of a modification reaction on a silica surface, the alcohol-based compound may be a linear alcohol, such as methanol, ethanol, propanol, or n-butanol, having a 1 to 4 carbon atoms, and one kind by itself, or a mixture of two or more kinds, may be used. More specifically, the alcohol-based compound may be ethanol.

It may be desirable to add the silazane-based surface modification agent and alcohol-based compound in stoichiometric amounts, taking into consideration the reaction of the silazane-based surface modification agent and the alcohol-based compound.

Moreover, when mixing a silazane-based surface modification agent and an alcohol-based compound in order to prepare the reaction solution, an acid catalyst may be further used as a reaction catalyst. The acid catalyst may not only promote decomposition of the surface modification agent, but may also subsequently promote gelation of silica sol. The acid catalyst may specifically comprise at least one kind of inorganic acid, such as nitric acid, hydrochloric acid, acetic acid, sulfuric acid, or hydrofluoric acid and the like, and be used at a content which does not suppress a reaction of a silazane-based surface modification agent and an alcohol-based compound, and which is capable of promoting the gelation of silica sol.

In the reaction solution prepared according to a method such as above, an alkoxysilane-based compound formed by a decomposition reaction of the silazane-based surface modification agent and the alcohol-based compound is included. The alkoxysilane-based compound acts as a co-precursor during subsequent gelation, thereby hydrophobizing silica. Thus, when preparing a silica aerogel-containing blanket, a hydrophobizing surface modification step on the silica aerogel may be omitted. As a result, the amount of solvent and surface modification agent used may be reduced, and process times and manufacturing costs may be reduced.

Specifically, the alkoxysilane-based compound formed in the reaction solution may be a trialkylalkoxysilane-based compound (here, the alkyl is a functional group derived from a silazane-based surface modification agent, specifically an alkyl group having a 1 to 8 carbon atoms, and the alkoxy may be a functional group derived from an alcohol-based compound, which is a polar organic solvent, and specifically, may be an alkoxy group having a 1 to 8 carbon atoms).

For example, when the silazane-based surface modification agent is trimethyldisilazane, an alkoxysilane-based compound such as trimethylalkoxysilane may be formed when trimethyldisilazane is decomposed as in Reaction Formula 1 below.

$(CH_3)_3Si-NH-Si(CH_3)_3 + 2ROH \rightarrow 2((CH_3)_3Si-OR) + NH_3$      [Reaction Formula 1]

In Reaction Formula 1 above, R may be a functional group derived from an alcohol-based compound, specifically an alkyl group, more specifically an alkyl group having a 1 to 8 carbon atoms, and even more specifically, a linear alkyl group having a 1 to 4 carbon atoms.

Typical silazane-based surface modification agents, including trimethyldisilazane, due to having a high content of a hydrophobic group, that is, an alkyl group, included in a molecule, may increase hydrophobicity when surface modifying silica, and thus are used as surface modification agents or hydrophobizing agents for silica aerogels. However, since each silazane-based compound molecule can react with two hydrophilic groups (—OH), there is a disadvantage in that large amounts are required for surface modification of silica. When, as in Reaction Formula 1 above, a silazane-based compound is subjected to a decomposition reaction by alcohol, two alkoxysilane-based compound molecules may be produced from one silazane-based compound molecule. In addition, the produced alkoxysilane-based compound, by including at most three alkoxy groups in a single molecule, may further increase hydrophobicity when a silica aerogel is surface-modified. Moreover, an alkoxysilane-based compound may participate in gelation by acting as a co-precursor, and the amount of a surface modification agent used for hydrophobizing a silica aerogel may be minimized.

In addition, as a result of a decomposition reaction of the silazane-based surface modification agent, ammonia may be produced in a reaction solution. The ammonia may be dissolved in a reaction solution, thereby increasing the pH of the solution, and consequently, the amount of a base used later for gelation of silica sol may be decreased. Moreover, ammonia produced as a result of a decomposition reaction of the surface modification agent may exhibit, along with a base added later, a multistep introduction reaction effect, thereby making control of gelation rate and efficiency convenient.

Step 2

In a method for preparing a silica aerogel-containing blanket according to an embodiment of the present invention, Step 2 is a step for preparing a silica gel-base material composite by using a reaction solution prepared in Step 1 to prepare a silica sol, and gelating the silica sol by immersing in the silica sol, a base material for the blanket.

Specifically, the silica sol may be prepared by adding to a reaction solution prepared in Step 1, a silica precursor, water, a polar organic solvent, and selectively, a base.

A silica precursor typically used for preparing a silica aerogel may be used without particular limit in preparing the silica sol. Specifically, the silica precursor may be a silicon-containing alkoxide-based compound, and more specifically, may be a tetraalkyl silicate, such as tetramethyl orthosilicate (TMOS), tetraethyl orthosilicate (TEOS), methyl triethyl orthosilicate, dimethyl diethyl orthosilicate, tetrapropyl orthosilicate, tetraisopropyl orthosilicate, tetrabutyl orthosilicate, tetra secondary butyl orthosilicate, tetra tertiary butyl orthosilicate, tetrahexyl orthosilicate, tetracyclohexyl orthosilicate, or tetradodecyl orthosilicate and the like. Here, the alkyl group may be an alkyl group having a carbon number of 1 to 20, or a cycloalkyl group having a carbon number of 3 to 20. Among these, the silica precursor may be tetramethyl orthosilicate (TMOS), tetraethyl orthosilicate (TEOS), or a mixture thereof.

Moreover, the silica precursor is hydrolyzed by water and a polar organic solvent which are added later, and silica ($SiO_2$) is produced as a result.

Thus, pre-hydrolysis products of the compounds may also be used as the silica precursor. Such pre-hydrolysis products may be used after being produced directly, or after being obtained commercially. When produced directly, a pre-hydrolysis product may be used, in which TEOS is added to a mixture of water and alcohol, and then hydrolyzed by adding an acid catalyst such that the pH is in the range of 2.5 to 2.9.

More specifically, the silica precursor may be a pre-hydrolysis product in which the degree of hydrolysis is at least 50%, more specifically, 50% to 90%, and even more specifically, 70% to 80%. When preparing silica sol, acid is typically added for hydrolysis of a silica precursor. However, when using a pre-hydrolysis product having a degree of hydrolysis in the above range, the addition of acid is not necessary, a hydrolysis process of a silica precursor may be shortened or omitted, and a later surface modification reaction may be promoted.

In the present invention, degree of hydrolysis may be calculated from the equivalent of water that has reacted with 1 equivalent of a silica precursor material during a hydrolysis reaction according to Reaction Formula 2 below.

$Si(OR)_4 + 2xH_2O \rightarrow (Si(OR)_4)_{(1-x)}(O)_{2x} + 4X(ROH)$      [Reaction Formula 2]

In Reaction Formula 1 above, X=degree of hydrolysis (%)/100.

For example, in the case of tetraethyl orthosilicate (TEOS), when 1 equivalent of TEOS is reacted with 1.54 equivalent of water, the degree of hydrolysis (X) of TEOS, according to Reaction Formula 3, below is 77%.

$Si(OC_2H_5)_4 + 1.54H_2O \rightarrow [(Si(OC_2H_5)_4)_{0.23}(O)_{1.54}] + 3.08C_2H_5OH$      [Reaction Formula 3]

The silica precursor may be used in such an amount that the silica ($SiO_2$) content in a silica sol is 0.1 to 30 wt %, and here, the silica sol is as defined above. When the silica sol content is below 0.1 wt %, the content of silica aerogel is low in a blanket that is ultimately manufactured, and when the silica sol content exceeds 30 wt %, there is a concern that the mechanical properties, particularly the flexibility, of a blanket may be degraded due to excessive formation of silica aerogel.

Moreover, water used in preparing a composition for forming the silica aerogel may be used in a ratio of 0.1 mol to 16 mol per 1 mol of silica ($SiO_2$) included in a silica sol. When the amount of water used is less than 0.1 mol, there is a concern of the surface modification reaction rate decreasing, and when the amount of water used exceeds 16 mol, there is a concern of thermal conductivity decreasing due to contraction during drying, in particular, supercritical drying. More specifically, 4 mol to 10 mol of the water may be used per 1 mol of silica.

Furthermore, a polar organic solvent used in preparing a composition for forming the silica aerogel may be an alcohol-based solvent. The alcohol-based solvent may be a monovalent alcohol, such as methanol, ethanol, isopropanol, or butanol and the like; or a polyvalent alcohol, such as glycerol, ethylene glycol, propylene glycol, diethylene glycol, dipropylene glycol, or sorbitol and the like, and one or a mixture of two or more thereof may be used. Among these, when miscibility with water and aerogel is considered, the polar organic solvent may be a monovalent alcohol-based solvent, such as methanol, ethanol, isopropanol, or butanol and the like, having 1 to 6 carbon atoms.

Such a polar organic solvent promotes a surface modification reaction, and may be used at an appropriate content by considering the hydrophobicity of a silica aerogel that is ultimately produced.

Moreover, when a silazane-based surface modification agent is an alkoxysilane produced by being decomposed by alcohol, the silazane-based surface modification agent includes a methyl group that does not participate in a hydrolysis reaction, and thus a hydrolysis reaction for forming a gel does not easily occur. Thus, by selectively further adding a base, a hydrolysis reaction may be promoted to form a stable gel.

The base may be an inorganic base, such as sodium hydroxide or potassium hydroxide and the like; or an organic base, such as ammonium hydroxide and the like, but in the case of inorganic bases, there is a concern that metal ions included in a compound may be coordinated to an Si—OH compound, and thus organic bases may be desirable. Specifically, the organic base may be ammonium hydroxide ($NH_4OH$), tetramethylammonium hydroxide (TMAH), tetraethylammonium hydroxide (TEAH), tetrapropylammonium hydroxide (TPAH), tetrabutylammonium hydroxide (TBAH), methylamine, ethylamine, isopropylamine, monoisopropylamine, diethylamine, diisopropylamine, dibutylamine, trimethylamine, triethylamine, triisopropylamine, tributylamine, choline, monoethanolamine, diethanolamine, 2-aminoethanol, 2-(ethylamino)ethanol, 2-(methylamino)ethanol, n-methyldiethanolamine, dimethylaminoethanol, diethylaminoethanol, nitrilotriethanol, 2-(2-aminoethoxy)ethanol, 1-amino-2-propanol, triethanolamine, monopropanolamine, or dibutanolamine and the like, and one or a mixture of two or more thereof may be used. More specifically, the base may be ammonium hydroxide ($NH_4OH$).

The base may be included in such an amount that the pH of a silica sol is 4 to 8. When the pH of the silica sol is outside this range, gelation is not convenient or the rate of gelation is excessively slow, and thus there is a concern of reduced processability. Moreover, since there is a concern of the base precipitating when introduced in the form of a solid, it may be desirable to add the base in the form of a solution diluted by a polar organic solvent described above.

Next, a base material for a blanket is immersed in a silica sol produced as a result of mixing such components as above.

The base material for a blanket may be a film, a sheet, a net, a fiber, a porous body, a foam, a non-woven fabric, or a laminate of two or more layers thereof. Moreover, a surface roughness may be formed on the surface or the surface may be patterned according to the use. More specifically, the base material for a blanket may be a fiber which may further enhance thermal insulation performance by including a space or pores that allow an aerogel to be easily inserted into the base material for a blanket. In addition, the base material for a blanket may desirably have a low thermal conductivity.

Specifically, the base material for a blanket may be polyamide, polybenzimidazole, polyaramid, an acrylic resin, a phenolic resin, polyester, polyetheretherketone (PEEK), a polyolefin (for example, polyethylene, polypropylene, or a copolymer thereof and the like), cellulose, carbon, cotton, wool, hemp fiber, a non-woven fiber, a glass fiber, or a ceramic wool and the like, and is not limited thereto. More specifically, the base material may include a glass fiber or polyethylene.

Moreover, the base material for a blanket may be subjected to a hydrophobizing treatment. A hydrophobizing treatment of the base material for a blanket may be performed according to typical methods, and specifically, may be a halogen-substituted or unsubstituted linear aliphatic hydrocarbon group (an alkyl group having a carbon number of 1 to 20 or an alkylene group having a carbon number of 2 to 20 and the like), an aromatic hydrocarbon group (an aryl group having a carbon number of 6 to 20), an organosilicon group, or combinations thereof. More specifically, the hydrophobizing treatment may be performed by using a compound including a hydrophobic functional group, such as a halogenated alkyl group, a silyl group, an aminosilyl group, an alkyl group, a vinyl group, an aryl group, an arylalkyl group, or an alkylaryl group, to surface-treat a base material for a blanket.

More specifically, the compound for a hydrophobizing treatment may be a silane-based or siloxane-based compound including a hydrophobic functional group described above. More specifically, the compound for a hydrophobizing treatment may be a hexamethyldisilazane (HMDS), trimethylchlorosilane (TMSCL), silicone oil, aminosilane, alkylsilane, polydimethylsiloxane (PDMS), or dimethyldichlorosilane (DDS) and the like, and one or a mixture of two or more thereof may be used.

Moreover, although the surface treatment method is not particularly limited, the surface of a carbon coating layer may be coated with a hydrophobic material by chemical vapor deposition (CVD) or physical vapor deposition (PVD). Fluidized bed chemical vapor deposition, rotating-bed chemical vapor deposition, or vibrational chemical vapor deposition and the like may be used as the chemical vapor deposition technique, and sputtering, vacuum deposition, or plasma coating and the like may be used as the physical vapor deposition technique. As a result of a hydrophobizing treatment such as above, a hydrophobic functional group is present on the surface of a base material for a blanket, and consequently, the adhesiveness with a hydrophobic aerogel may be further enhanced.

Furthermore, the base material for a blanket is desirably low-density, and specifically, when the base material is a fiber, fibers making up the fiber may have an average diameter of 0.1 μm to 30 μm.

In addition, a functional layer, such as a heat reflection layer for enhancing thermal insulation performance or a surface protection layer capable of enhancing lifetime properties through surface protection and the like, may be further formed on a portion or the entirety of the base material for a blanket.

For example, the heat reflection layer includes a compound that can reflect or block infrared radiation, and specifically, carbon black, carbon fiber, titanium dioxide, a metal (aluminum, stainless steel, a copper/zinc alloy, a copper/chromium alloy, etc.), a non-metal, a fiber, or a pigment and the like may be included. Moreover, the surface protection layer may include a highly heat resistant, vapor permeable, water resistant material, such as polytetrafluoroethylene.

Lamination of the functional layer may be performed by forming the functional layer directly on at least one face of a thermal insulation blanket, or by positioning and then laminating the functional layer on at least one face of the thermal insulation blanket. The lamination process may be performed according to a typical method, such as heat treatment or hot rolling processing.

After immersion of the base material for a blanket, gelation of a silica sol occurs such that a silica gel-base material composite is manufactured.

In a typical hydrophobization of a silica aerogel, gelation occurs concurrently with a decomposition reaction of a surface modification agent, and thus the gelation time is long at about 1 to 2 hours. Consequently, the structure of an aerogel is weak such that contraction occurs during drying, and as a result, there is a limitation wherein thermal conductivity is reduced. Accordingly, in a preparation method of the present invention, since a surface modification agent is used after being decomposed beforehand, even when gelation time is shortened to 10 minutes, a hydrolysis reaction of an aerogel precursor and trimethylalkoxysilane formed by a decomposition reaction of HMDS occurs sufficiently such that a gel structure is hardened, and thus there is no concern of reduced thermal conductivity.

After preparation of the silica gel-base material composite, and prior to a subsequent drying process, at least one among a stabilization process, a pre-aging process, and an aging process may selectively be further performed on the prepared silica gel-base material composite. Thus, a method for preparing a silica aerogel-containing blanket according to an embodiment of the present invention may further include one or two or all of the processes among a stabilization process, a pre-aging process, and an aging process performed after preparation of the silica gel-base material composite.

The stabilization process may be performed after gelation is complete by maintaining a prepared silica gel-base material composite at 18° C. to 25° C. for 10 to 30 minutes.

Moreover, the pre-aging process may be performed by maintaining at 50° C. to 70° C. for 30 to 50 minutes, a silica gel-base material composite obtained after the completion of gelation or after the stabilization process.

Furthermore, the aging process is a process for leaving the silica gel-base material composite at an appropriate temperature such that a chemical change takes place completely, and an ageing process on a silica gel-base material composite may strengthen a network structure inside a silica gel. In addition, during aging, moisture inside a silica gel may be substituted with a polar organic solvent, and consequently, deformation or reduction of the porous structure of a silica gel due to evaporation of moisture inside the silica gel in a subsequent drying process may be prevented.

Specifically, the aging process may be performed by maintaining the silica gel-base material composite at 50° C. to 80° C.

Moreover, the aging process may be performed until chemical changes in the silica gel-base material composite are complete, and specifically, may be performed for 1 to 6 hours or 3 to 4 hours.

Step 3

In a method for preparing a silica aerogel-containing blanket according to an embodiment of the present invention, Step 3 is a step for manufacturing a silica aerogel-containing blanket by drying a silica gel-base material composite prepared in Step 2.

The drying process may specifically be performed by a supercritical drying process using supercritical carbon dioxide.

Carbon dioxide ($CO_2$) is in a gaseous state at room temperature and atmospheric pressure, but past a predetermined temperature and pressure limit called the supercritical point, an evaporation process does not occur, and thus carbon dioxide is in a supercritical state in which gas and liquid are indistinguishable. Carbon dioxide in this supercritical state is called supercritical carbon dioxide. Supercritical carbon dioxide has a molecular density that is similar to a liquid, but having a low viscosity, has properties similar to a gas. Moreover, supercritical carbon dioxide diffuses quickly, has a high thermal conductivity, and can shorten a drying process time.

Other than using a silica gel-base material composite prepared in Step 2, the supercritical drying process may be performed according to typical methods. Specifically, in the supercritical drying process, after an aged silica gel-base material composite is placed in a supercritical drying reactor, the reactor is filled with liquid state $CO_2$ and a solvent substitution process is performed in which alcohol inside a silica aerogel is substituted with $CO_2$. Next, after increasing the temperature at a predetermined rate of temperature increase specifically 0.1° C./min to 1° C./min, to 40 to 50° C., carbon dioxide is maintained in a supercritical state for a predetermined time specifically 20 minutes to 1 hour by maintaining the pressure at or above the pressure specifically 100 to 150 bar at which carbon dioxide becomes a supercritical state. Typically, carbon dioxide is in a supercritical state at a temperature of 31° C. and a pressure of 73.8 bar. After maintaining carbon dioxide at a predetermined temperature and pressure at which carbon dioxide is in a supercritical state for 2 to 12 hours, more specifically 2 to 6 hours, the pressure may be gradually released to complete a supercritical drying process.

As a result of a drying process such as above, a blanket including a porous silica aerogel having nanosized pores may be manufactured. In addition to high hydrophobicity, the silica aerogel has excellent physical properties, particularly a high porosity, and a silica aerogel-containing blanket including the same has both low thermal conductivity and excellent mechanical flexibility.

When considering optimal combinations of manufacturing conditions in each of the steps, and the significance of an improvement effect on physical properties of a silica aerogel-containing blanket manufactured accordingly, a method for preparing a silica aerogel-containing blanket according to an embodiment of the present invention may include a step for preparing a reaction solution including an alkoxysilane-based compound produced by a decomposition reaction of a silazane-based surface modification agent and an alcohol-based compound, the reaction solution being prepared by reacting the silazane-based surface modification agent of Formula 1 below with an alcohol-based compound; a step for preparing a silica gel-base material composite by adding a silica precursor, water, a linear alcohol having a 1 to 4 carbon atoms as a polar solvent, and a base to the reaction solution to prepare a silica sol, and then immersing a base material for a blanket in the prepared silica sol to gelate the silica sol for a time of 10 minutes or less; a step for performing an aging process in which the silica gel-base material composite is maintained at a temperature of 50° C. to 80° C.; and a step for supercritically drying the aged silica gel-base material composite. Here, the types and contents of the materials used, and the manufacturing conditions in each step are as described above.

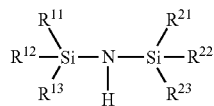

[Formula 1]

(In Formula 1, $R^{11}$ to $R^{13}$ and $R^{21}$ to $R^{23}$ are each independently a hydrogen atom or an alkyl group having a 1 to 8 carbon atoms, with the proviso that $R^{11}$ to $R^{13}$ and $R^{21}$ to $R^{23}$ are not simultaneously hydrogen atoms, and more specifically, at least two among $R^{11}$ to $R^{13}$ and $R^{21}$ to $R^{23}$ are alkyl groups).

Thus, according to another embodiment of the present invention, a blanket and a thermal insulation material, which include a silica aerogel and are manufactured by the preparing method, are provided.

Specifically, the blanket includes a silica aerogel on at least one face and inside a base material for the blanket.

A silica aerogel included in a blanket manufactured by a preparing method such as described above is a porous structure in the form of a particle including multiple micropores, and includes a microstructure in which nano-sized primary particles, specifically primary particles having an average particle diameter ($D_{50}$) of at most 100 nm, specifically 1 to 50 nm, are connected, thereby forming a cluster in the form of a net, that is, a three-dimensional network structure.

Accordingly, the porosity, specific surface area, or average particle diameter of a silica aerogel may be adjusted through control of a preparation process when preparing the silica aerogel, and consequently, the thermal conductivity and thermal insulation properties of a blanket may also be controlled.

Specifically, the silica aerogel prepared by the preparation method may have a thermal conductivity of at most 20 mW/mK, more specifically, at most 16 mW/mK. In the present invention, the thermal conductivity of an aerogel may be measured by using a thermal conductivity measurement device.

Moreover, the silica aerogel may, by itself, exhibit hydrophobicity, or may be hydrophobically surface-treated.

In a typical silica aerogel, hydrophobicity or the level of hydrophobicness may be confirmed using the carbon content in the silica aerogel. Thus, a silica aerogel which can be used when preparing an aerogel-containing composition according to an embodiment of the present invention may have a carbon content of at least 5 wt %, more specifically, at least 6 wt %, and even more specifically, 6 wt % to 9 wt % with respect to the total weight of the silica aerogel.

In the present invention, the carbon content in a silica aerogel may be measured using a carbon analyzer.

The thermal insulation properties increase with increased silica aerogel content in the blanket. However, when the content is excessively high, there is a concern wherein the low strength and adhesiveness of a silica aerogel itself can later cause a decrease in strength and adhesiveness during manufacturing of a blanket, and thus it may be desirable to appropriately adjust the content of silica aerogel in the blanket by considering the use and the like of the blanket. Specifically, 20 wt % to 80 wt % of the silica aerogel may be included with respect to the total weight of a blanket.

A blanket such as above, by including a silica aerogel having high hydrophobicity along with excellent physical properties, particularly high porosity, has a low thermal conductivity along with excellent low-density mechanical flexibility. Thus, the blanket is useful as a thermal insulation material, a heat-retaining material, or a non-combustible material for not only piping for various industrial equipment or plant equipment, such as a furnace, for retaining heat and cold, but also for aircraft, ships, automobiles, or construction structures and the like.

Hereinafter, the present invention is described in greater detail using the examples and experimental examples below. However, the examples and experimental examples below are merely for exemplifying the present invention, and the scope of the present invention is not limited by these examples and experimental examples.

Example 1

1.67 g of HMDS and 43.945 g of ethanol were added to, and reacted in, a 500 ml round-bottom flask to obtain a reaction solution. 28.92 g of pre-hydrolyzed TEOS (silica concentration of 19.5% and hydrophobicity of 77%) was added to and thereby mixed with the resultant reaction solution, and water (in an amount of 1 mol per 1 mol of silica ($SiO_2$) was further mixed by being added thereto. Silica sol (100 ml) was prepared by adding 11 g of ethanol and 0.67 ml of $NH_4OH$ (30%) to the resultant reaction mixture. Polyester fiber was added to the silica sol, and gelation was performed. Here, it took about 10 minutes for gelation to be completed. Afterwards, aging was performed in a 70° C. oven for 4 hours. After aging was completed, a silica gel-fiber composite was placed in a 7.2 L supercritical extractor, and $CO_2$ was injected. Next, the temperature in the extractor was increased to 50° C. over 1 hour and 20 minutes, and when 50° C. and 100 bar was reached, $CO_2$ was continuously injected at a rate of 0.7 L/min for 150 minutes. Here, ethanol was recovered through a lower end of a separator. $CO_2$ was vented for the next 2 hours, and a silica aerogel-containing blanket was manufactured.

Example 2

Other than using a ratio of 3 mol of water per 1 mol of silica, rather than 1 mol of water per 1 mol of silica as in Example 1, a silica aerogel-containing blanket was manufactured by performing the same method as Example 1.

Example 3

Other than using 3.33 g of the HMDS in Example 1, a silica aerogel-containing blanket was manufactured by performing the same method as Example 1.

Example 4

Other than using a ratio of 3 mol of water per 1 mol of silica, rather than 1 mol of water per 1 mol of silica as in Example 1, and using 3.33 g of HMDS, a silica aerogel-containing blanket was manufactured by performing the same method as Example 1.

Example 5

Other than using 4.98 g of the HMDS in Example 1, a silica aerogel-containing blanket was manufactured by performing the same method as Example 1.

Example 6

Other than using a ratio of 3 mol of water per 1 mol of silica, rather than 1 mol of water per 1 mol of silica as in Example 1, and using 4.98 g of HMDS, a silica aerogel-containing blanket was manufactured by performing the same method as Example 1.

Example 7

Other than adding nitric acid ($HNO_3$) as an acid catalyst when reacting ethanol and HMDS in Example 1, using a ratio of 2 mol of water per 1 mol of silica, and using 3.66 g of HMDS, a silica aerogel-containing blanket was manufactured by performing the same method as Example 1.

Comparative Example 1

28.90 g of pre-hydrolyzed TEOS (silica concentration of 19.5 wt and hydrophobicity of 77%) as a silica precursor was mixed with 43.95 g of ethanol to prepare 100 ml (target density (TD) of 56 kg/m$^3$) of a silica sol.

A solution of 11 g of ethanol and 0.67 ml of $NH_4OH$ (30%) was prepared separate from this, and then mixed with the silica sol. After introducing the resultant mixture in a sealed vessel, polyester fiber was deposited thereon and gelation was prepared for 10 minutes. Next, aging was performed in a 70° C. oven for 4 hours. After aging was completed, a silica gel-fiber composite was placed in a 7.2 L supercritical extractor, and $CO_2$ was injected. Next, the temperature in the extractor was increased to 50° C. over 1 hour and 20 minutes, and when 50° C. and 100 bar was reached, $CO_2$ was continuously injected at a rate of 0.7 L/min for 150 minutes. Here, ethanol was recovered through a lower end of a separator. $CO_2$ was vented for the next 2 hours, and a silica aerogel-containing blanket was manufactured.

Comparative Example 2

Other than using a mixture of ethanol and HMDS (90:10 ratio by volume) to perform a further step for performing surface modification at 70° C. for 2.5 to 4 hours on a silica gel-fiber composite obtained after the aging in Comparative Example 1, a silica aerogel-containing blanket was manufactured by performing the same method as Comparative Example 1.

Comparative Example 3

Other than using a ratio of 2 mol of water per 1 mol of silica when preparing the sol in Comparative Example 2, a silica aerogel-containing blanket was manufactured by performing the same method as Comparative Example 2.

Comparative Example 4

Other than performing gelation by introducing HMDS to a silica sol and depositing a polyester fiber, while excluding the step in Example 1 for reacting HDMS with ethanol, a silica aerogel-containing blanket was manufactured by performing the same method as Example 1. Here, it took 2 hours for gelation to be completed.

Experimental Example 1

Infrared spectroscopic analysis was performed on reaction solutions prepared by inducing decomposition reactions of HDMS and alcohol when manufacturing the blankets including a silica aerogel in Examples 1 to 7, and whether or not decomposition of HMDS and formation of alkoxysilane occurred was confirmed. The results are displayed in FIG. 1.

As displayed in FIG. 1, formation of an alkoxysilane compound in the reaction solutions prepared in Examples 1 to 7 could be confirmed, and it could be confirmed that a decomposition reaction was further promoted when an acid catalyst was used in the decomposition reaction as in Example 7.

Experimental Example 2

A thermal conductivity measurement device was used for thermal conductivity evaluation of the blankets including a silica aerogel manufactured in Examples 1 to 7 and Comparative Examples 1 to 4. The results are displayed in Table 1 below.

TABLE 1

| | HMDS (g/100 ml sol) | Water (mol/SiO$_2$ mol) | Acid catalyst (g/100 ml sol) | Presence of surface modification step and amount of HMDS used (g/100 ml sol) | Thermal conductivity (mW/mK) |
|---|---|---|---|---|---|
| Example 1 | 1.67 | 1 | — | x | 14.7 |
| Example 2 | 1.67 | 3 | — | x | 14.8 |
| Example 3 | 3.33 | 1 | — | x | 14.0 |
| Example 4 | 3.33 | 3 | — | x | 13.6 |
| Example 5 | 4.98 | 1 | — | x | 14.2 |
| Example 6 | 4.98 | 3 | — | x | 13.6 |
| Example 7 | 3.66 | 2 | 1.48 | x | 15.3 |
| Comparative Example 1 | — | — | — | x | 18.0 |
| Comparative Example 2 | — | — | — | o (13.68) | 14.0 |
| Comparative Example 3 | — | 2 | — | o (13.68) | 14.1 |
| Comparative Example 4 | 1.67 | 1 | — | x | 17.8 |

As shown in Table 1, the blankets including a silica aerogel of Examples 1 to 7, manufactured according to a preparing method of the present invention by using a co-precursor method exhibited significantly lower thermal conductivities compared to the silica aerogel-containing blanket of Comparative Example 1 manufactured without surface modification, and exhibited improved thermal conductivity properties, that is, a low thermal conductivity, on a level at least equal to the blankets including a silica aerogel of Comparative Examples 2 and 3 manufactured by performing a separate surface modification step. In particular, when considering that the content of HDMS surface modification agent used in Examples 1 to 7 was an amount reduced by at least 50% and at most 80% compared to Comparative Examples 2 and 3, it can be seen that a silica aerogel-containing blanket having a low thermal conductivity can be manufactured using a minimal amount of a surface modification agent and without a separate surface modification process, by a preparing method according to the present invention.

Moreover, in the case of Comparative Example 4, in which HMDS was directly introduced without being decomposed in advance, the gelation time increased such that the thermal conductivity of an aerogel was greatly reduced.

Experimental Example 3

Hydrophobicity evaluation was performed on blankets including a silica aerogel manufactured in Example 1 and Comparative Example 1.

Specifically, in the hydrophobicity evaluation, drops of water were dropped on the blankets including a silica aerogel manufactured in Example 1 and Comparative Example 1, and then it was observed whether the drops of water were absorbed into the blankets. The results are displayed in FIGS. 2a and 2b, respectively.

Figure 2A:
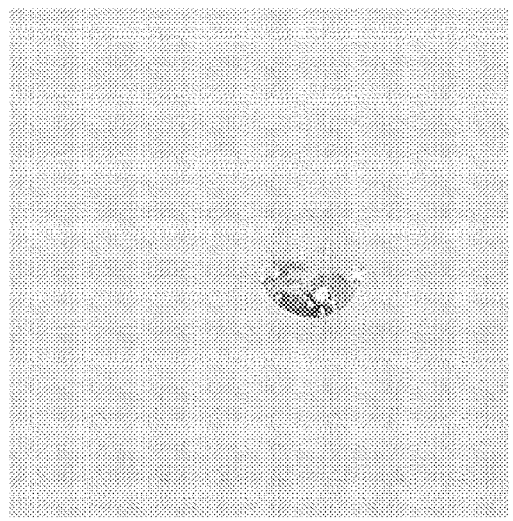
FIGS. 2a and 2b are photographs indicating results of evaluating the hydrophobicity of silica aerogel-containing blanket, prepared in Example 1 and Comparative Example 1, respectively.
Figure 2B:
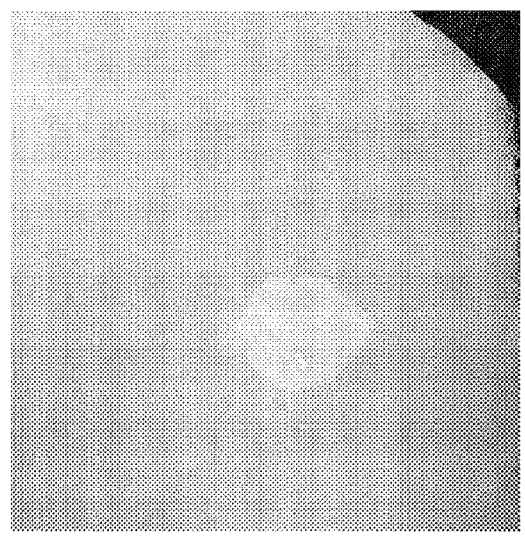

FIG. 2a is a photographic observation of the results of tests evaluating the hydrophobicity of the silica aerogel-containing blanket of Example 1, and FIG. 2b is a photographic observation of the results of tests evaluating the hydrophobicity of the silica aerogel-containing blanket of Comparative Example 1.

As shown in FIGS. 2a and 2b, the drop of water was maintained and did not infiltrate the silica aerogel-containing blanket of Example 1. Accordingly, it was observed that the silica aerogel-containing blanket of Example 1 has hydrophobicity, and it can be seen that such a result is due to the HMDS used as a co-precursor modifying the surface of the silica aerogel to be hydrophobic. Meanwhile, since the drop of water infiltrated the silica aerogel-containing blanket of Comparative Example 1, it was confirmed that hydrophobicity is lacking. Moreover, from such a result, it is anticipated that there will be a concern that the thermal conductivity will increase further as hydrophilic silanol groups (Si—OH) present on the surface of silica later absorb water from the air.

Experimental Example 4

For evaluation of hydrophobicity, aerogel blankets were shaken in order to recover only the aerogel, and then a carbon analyzer was used to analyze carbon content. The results are displayed in Table 2 below.

TABLE 2

|  | Carbon content (wt %) |
|---|---|
| Example 1 | 6.1 |
| Example 2 | 6.3 |
| Example 3 | 7.0 |
| Example 4 | 7.2 |
| Example 5 | 8.0 |
| Example 6 | 8.2 |
| Example 7 | 7.2 |
| Comparative Example 1 | — |
| Comparative Example 2 | 8.5 |
| Comparative Example 3 | 8.5 |
| Comparative Example 4 | 3.5 |

As a result of testing, in the case of Examples 1 to 7, as the amount of HMDS increased, carbon content increased due to increased hydrophobicity. Moreover, compared to Comparative Example 4, in which HMDS was directly introduced without being decomposed beforehand, a greater increase in hydrophobicity was exhibited. Specifically, in the case of Example 1, the carbon content increased by 2.6 wt % compared to Comparative Example 4. Typical HMDS has an extremely slow rate of decomposition when decomposed in ethanol, and in the case of Comparative Example 4, since HMDS was directly introduced without being decomposed beforehand, HMDS was insufficiently decomposed such that even though the same amount was used as in Example 1, significantly lower hydrophobicity was exhibited.

The invention claimed is:

1. A method for preparing a silica aerogel-containing blanket, comprising:
a step for preparing a reaction solution including an alkoxysilane-based compound produced by decomposition of a silazane-based surface modification agent and an alcohol-based compound by reacting the silazane-based surface modification agent with the alcohol-based compound;
a step for preparing a silica gel-base material composite by adding a silica precursor, water, and a polar organic solvent to the reaction solution to prepare a silica sol, and then immersing a base material for a blanket in the prepared silica sol to gelate the silica sol; and
a step for drying the silica gel-base material composite.

2. The method of claim 1, wherein the silazane-based surface modification agent comprises a compound of Formula 1 below,

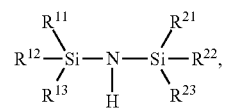

[Formula 1]

wherein $R^{11}$ to $R^{13}$ and $R^{21}$ to $R^{23}$ are each independently a hydrogen atom or an alkyl group having a 1 to 8 carbon atoms, with the proviso that $R^{11}$ to $R^{13}$ and $R^{21}$ to $R^{23}$ are not simultaneously hydrogen atoms.

3. The method of claim 1, wherein:
the silazane-based surface modification agent comprises one or a mixture of two or more selected from the group consisting of tetraalkyldisilazane and hexaalkyldisilazane; and
the alkyl is an alkyl having 1 to 4 carbon atoms.

4. The method of claim 1, wherein the alcohol-based compound is an alcohol having 1 to 8 carbon atoms.

5. The method of claim 1, wherein an acid catalyst is further added during the preparation of the reaction solution.

6. The method of claim 1, wherein the silica precursor comprises one or a mixture of two or more selected from the group consisting of silicon alkoxide-based compounds and pre-hydrolysis products thereof.

7. The method of claim 1, wherein the silica precursor comprises a pre-hydrolysis product of a tetraalkyl silicate having a degree of hydration of 50 to 90%.

8. The method of claim 1, wherein the silica precursor is used in such an amount that the content of silica in the silica sol is 0.1 to 30 wt %.

9. The method of claim 1, wherein the water is used in a ratio of 0.1 to 16 mol per 1 mol of silica included in the silica sol.

10. The method of claim 1, wherein the polar organic solvent includes an alcohol-based solvent.

11. The method of claim 1, wherein a base is further added during the preparation of the silica sol.

12. The method of claim 1, which further comprises a step for performing on the silica gel-base material composite, one or two or more processes selected from the group consisting of a stabilization process, a pre-aging process, and an aging process, prior to the drying of the silica gel-base material composite.

13. The method of claim 1, which further comprises a process for aging the silica gel-base material composite at a temperature of 50 to 80° C., prior to the drying of the silica gel-base material composite.

14. The method of claim 1, wherein the drying is performed by a supercritical drying process.

15. The method of claim 1, which comprises:
a step for preparing a reaction solution comprising an alkoxysilane-based compound produced by a decomposition reaction of the alkoxysilane-based surface modification agent and the alcohol-based compound by reacting the silazane-based surface modification agent of Formula 1 below with an alcohol-based compound;
a step for preparing a silica gel-base material composite by adding a silica precursor, water, a linear alcohol having a 1 to 4 carbon atoms as a polar organic solvent, and a base to prepare a silica sol, and then immersing a base material for a blanket in the prepared silica sol to gelate the silica sol;
a step for performing an aging process in which the silica gel-base material composite is maintained at a temperature of 50 to 80° C.; and
a step for supercritically drying the aged silica gel-base material composite,

[Formula 1]

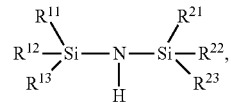

wherein $R^{11}$ to $R^{13}$ and $R^{21}$ to $R^{23}$ are each independently a hydrogen atom or an alkyl group having a 1 to 8 carbon atoms, and $R^{11}$ to $R^{13}$ and $R^{21}$ to $R^{23}$ are not simultaneously hydrogen atoms.

* * * * *